United States Patent
Ryu et al.

(10) Patent No.: US 11,589,325 B2
(45) Date of Patent: Feb. 21, 2023

(54) ZONE BASED SIDELINK TIME SYNCHRONIZATION

(71) Applicant: QUALCOMM Incorporated, San Diego, CA (US)

(72) Inventors: Jung Ho Ryu, Fort Lee, NJ (US); Sony Akkarakaran, Poway, CA (US); Kapil Gulati, Belle Mead, NJ (US); Tao Luo, San Diego, CA (US); Junyi Li, Franklin Park, NJ (US); Ling Ding, Chester, NJ (US); Tianyang Bai, Somerville, NJ (US); Qian Zhang, Basking Ridge, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/212,781

(22) Filed: Mar. 25, 2021

(65) Prior Publication Data

US 2021/0321344 A1    Oct. 14, 2021

Related U.S. Application Data

(60) Provisional application No. 63/008,261, filed on Apr. 10, 2020.

(51) Int. Cl.
*H04W 56/00* (2009.01)
*H04W 64/00* (2009.01)

(52) U.S. Cl.
CPC ........ *H04W 56/001* (2013.01); *H04W 64/00* (2013.01)

(58) Field of Classification Search
None
See application file for complete search history.

(56) References Cited

U.S. PATENT DOCUMENTS

2018/0324718 A1* 11/2018 Serrano ................. H04W 76/23
2021/0243762 A1*  8/2021 Selvanesan .......... H04L 5/0062

FOREIGN PATENT DOCUMENTS

EP            3621324 A1    3/2020
WO    WO-2020030688 A1    2/2020

OTHER PUBLICATIONS

Apple: "Discussion on Zone Configurations in RRC for NR V2X," 3GPP Draft, 3GPP TSG-RAN WG2 e-Meeting #109, R2-2000611, 3rd Generation Partnership Project (3GPP), Mobile Competence Centre, 650, Route Des Lucioles, F-06921, Sophia-Antipolis Cedex, France, vol. RAN WG2. No. e-Meeting, Feb. 24, 2020-Mar. 6, 2020, Feb. 14, 2020 (Feb. 14, 2020), XP051849190, 4 pages, Retrieved from the Internet: URL: https://ftp.3gpp.org/tsg_ran/WG2_RL2/TSGR2_109_e/Docs/R2-2000611.zip R2-2000611_zone_configuration.doc [retrieved-on Feb. 14, 2020], Section 2 figure 1.

(Continued)

*Primary Examiner* — Suhail Khan
(74) *Attorney, Agent, or Firm* — Harrity & Harrity, LLP

(57) ABSTRACT

Various aspects of the present disclosure generally relate to wireless communication. In some aspects, a first user equipment (UE) may determine whether to transmit a sidelink timing synchronization signal to a second UE based at least in part on a sidelink zone in which the first UE is located and a sidelink zone in which the second UE is located. The first UE may selectively transmit the sidelink timing synchronization signal to the second UE based at least in part on determining whether to transmit the sidelink timing synchronization signal to the second UE. Numerous other aspects are provided.

30 Claims, 7 Drawing Sheets

302a
Determine whether to transmit a sidelink timing synchronization signal to UE2 based at least in part on the sidelink zone in which UE1 is located and the sidelink zone in which UE2 is located 302b
Determine whether UE1 is to transmit a sidelink timing synchronization signal to UE2 based at least in part on the sidelink zone in which UE1 is located and the sidelink zone in which UE2 is located

(56) References Cited

OTHER PUBLICATIONS

Fujitsu: "Dynamic Resource Selection for NR Sidelink", 3GPP Draft, 3GPP TSG RAN WG1 #99, R1-1913273, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 17, 2019 (Nov. 17, 2019), XP051826002, pp. 1-19, Retrieved from the Internet: URL:https://ftp.3gpp.org/Meetings_3GPP_SYNC/RAN1/Docs/R1-1913273.zip R1-1913273, Dynamic Resource Selection for NR Sidelink.doc [retrieved on Nov. 17, 2019] Section 3: "Location-Zone based Tx-Rx Distance Acquisition" Section 4: "Location-Zone based Resource Selection".

Intel Corporation: "Open Aspects on Mode 2 Operation", 3GPP Draft, 3GPP TSG-RAN WG2 Meeting #109 electronic, R2-2000456, 3rd Generation Partnership Project (3GPP), Mobile Competence Centre, 650, Route Des Lucioles, F-06921, Sophia-Antipolis Cedex, France, vol. RAN WG2. No. Elbonia, Feb. 24, 2020-Mar. 6, 2020, Feb. 14, 2020 (Feb. 14, 2020), XP051849044, 3 pages, Retrieved from the Internet: URL: https://ftp.3gpp.org/tsg_ran/WG2_RL2/TSGR2_109_e/Docs/R2-2000456.zip R2-2000456.docx [retrieved on Feb. 14, 2020] Section 2.1, Section 2.2.

International Search Report and Written Opinion—PCT/US2021/024396—ISA/EPO—dated Jul. 2, 2021.

Lenovo, et al., "Zone Configuration and Tx Rx Distance Calculation", 3GPP Draft, 3GPP TSG RAN WG2 Meeting #e109, R2-2001077, 3rd Generation Partnership Project (3GPP), Mobile Competence Centre, 650, Route Des Lucioles, F-06921 Sophia-Antipolis Cedex, France, Feb. 13, 2020 (Feb. 13, 2020), XP051848717, 2 pages, Retrieved from the Internet: URL:https://ftp.3gpp.org/tsg_ran/WG2_RL2/TSGR2_109_e/Docs/R2-2001077.zip, R2-2001077 Zone-configuration and Tx Rx distancecalculation.docx [retrieved on Feb. 13, 2020] Section 1 Section 2.

* cited by examiner

ZONE BASED SIDELINK TIME SYNCHRONIZATION

CROSS-REFERENCE TO RELATED APPLICATION

This Patent Application claims priority to U.S. Provisional Patent Application No. 63/008,261, filed on Apr. 10, 2020, entitled "ZONE BASED SIDELINK TIME SYNCHRONIZATION," and assigned to the assignee hereof. The disclosure of the prior Application is considered part of and is incorporated by reference into this Patent Applications.

FIELD OF THE DISCLOSURE

Aspects of the present disclosure generally relate to wireless communication and to techniques and apparatuses for zone based sidelink time synchronization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first user equipment (UE), may include determining whether to transmit a sidelink timing synchronization signal to a second UE based at least in part on a sidelink zone in which the first UE is located and a sidelink zone in which the second UE is located; and selectively transmitting the sidelink timing synchronization signal to the second UE based at least in part on determining whether to transmit the sidelink timing synchronization signal to the second UE.

In some aspects, a method of wireless communication, performed by a first UE, may include determining whether a second UE is to transmit a sidelink timing synchronization signal to the first UE based at least in part on a sidelink zone in which the first UE is located and a sidelink zone in which the second UE is located; and selectively receiving the sidelink timing synchronization signal from the second UE based at least in part on determining whether the second UE is to transmit the sidelink timing synchronization signal to the first UE.

In some aspects, a first UE for wireless communication may include a memory and one or more processors coupled to the memory. The one or more processors may be configured to determine whether to transmit a sidelink timing synchronization signal to a second UE based at least in part on a sidelink zone in which the first UE is located and a sidelink zone in which the second UE is located; and selectively transmit the sidelink timing synchronization signal to the second UE based at least in part on determining whether to transmit the sidelink timing synchronization signal to the second UE.

In some aspects, a first UE for wireless communication may include a memory and one or more processors coupled to the memory. The one or more processors may be configured to determine whether a second UE is to transmit a sidelink timing synchronization signal to the first UE based at least in part on a sidelink zone in which the first UE is located and a sidelink zone in which the second UE is located; and selectively receive the sidelink timing synchronization signal from the second UE based at least in part on determining whether the second UE is to transmit the sidelink timing synchronization signal to the first UE.

In some aspects, a non-transitory computer-readable medium may store one or more instructions for wireless communication. The one or more instructions, when executed by one or more processors of a first UE, may cause the one or more processors to determine whether to transmit a sidelink timing synchronization signal to a second UE based at least in part on a sidelink zone in which the first UE is located and a sidelink zone in which the second UE is located; and selectively transmit the sidelink timing synchronization signal to the second UE based at least in part on determining whether to transmit the sidelink timing synchronization signal to the second UE.

In some aspects, a non-transitory computer-readable medium may store one or more instructions for wireless communication. The one or more instructions, when executed by one or more processors of a first UE, may cause the one or more processors to determine whether a second UE is to transmit a sidelink timing synchronization signal to the first UE based at least in part on a sidelink zone in which the first UE is located and a sidelink zone in which the second UE is located; and selectively receive the sidelink timing synchronization signal from the second UE based at least in part on determining whether the second UE is to transmit the sidelink timing synchronization signal to the first UE.

In some aspects, a first apparatus for wireless communication may include a memory and one or more processors coupled to the memory. first apparatus may include means for determining whether to transmit a sidelink timing synchronization signal to a second apparatus based at least in part on a sidelink zone in which the first apparatus is located and a sidelink zone in which the second apparatus is located; and means for selectively transmitting the sidelink timing synchronization signal to the second apparatus based at least in part on determining whether to transmit the sidelink timing synchronization signal to the second apparatus.

In some aspects, a first apparatus for wireless communication may include a memory and one or more processors coupled to the memory. The first apparatus may include means for determining whether a second apparatus is to transmit a sidelink timing synchronization signal to the first apparatus based at least in part on a sidelink zone in which the first apparatus is located and a sidelink zone in which the second apparatus is located; and means for selectively receiving the sidelink timing synchronization signal from the second apparatus based at least in part on determining whether the second apparatus is to transmit the sidelink timing synchronization signal to the first apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
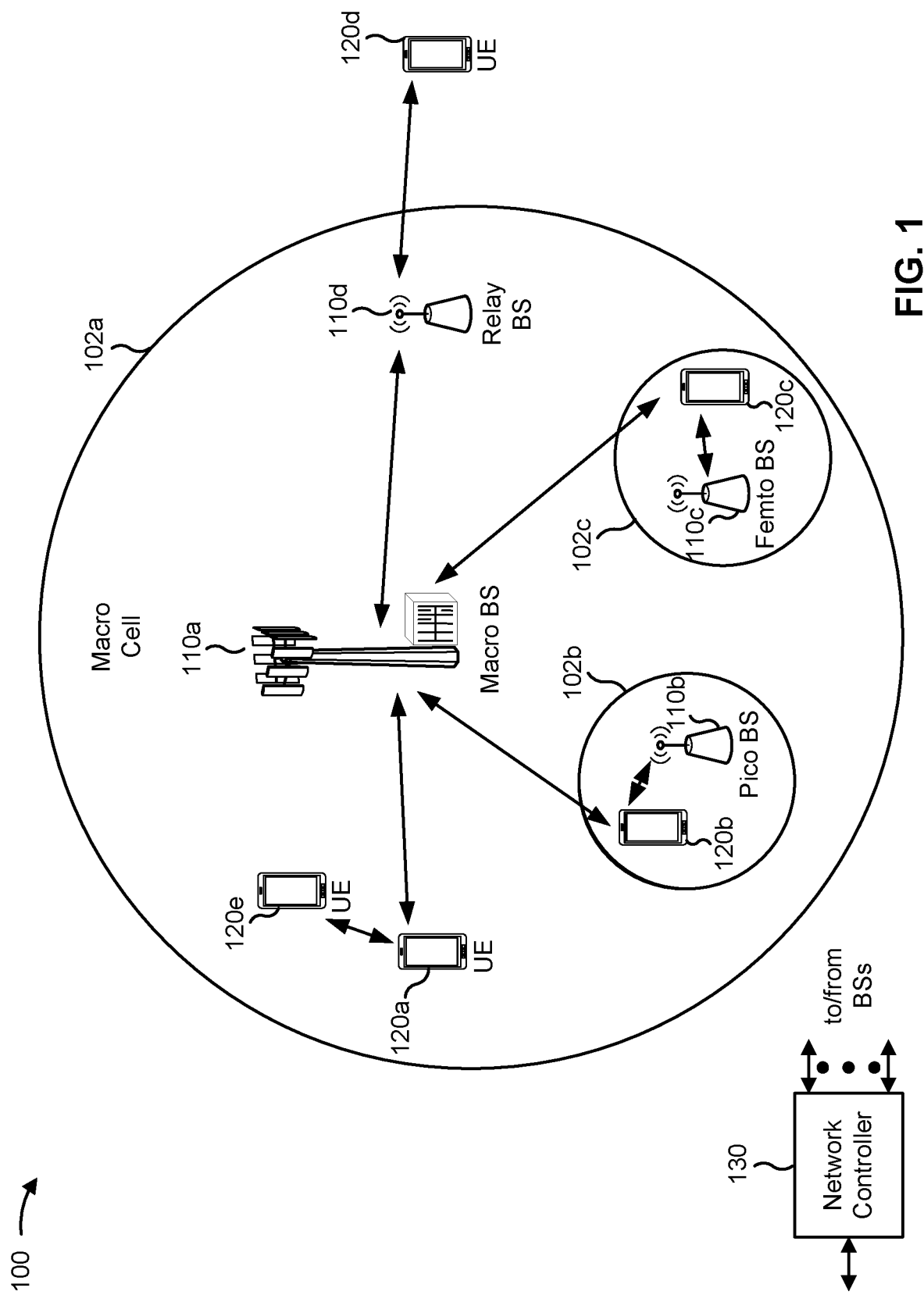
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
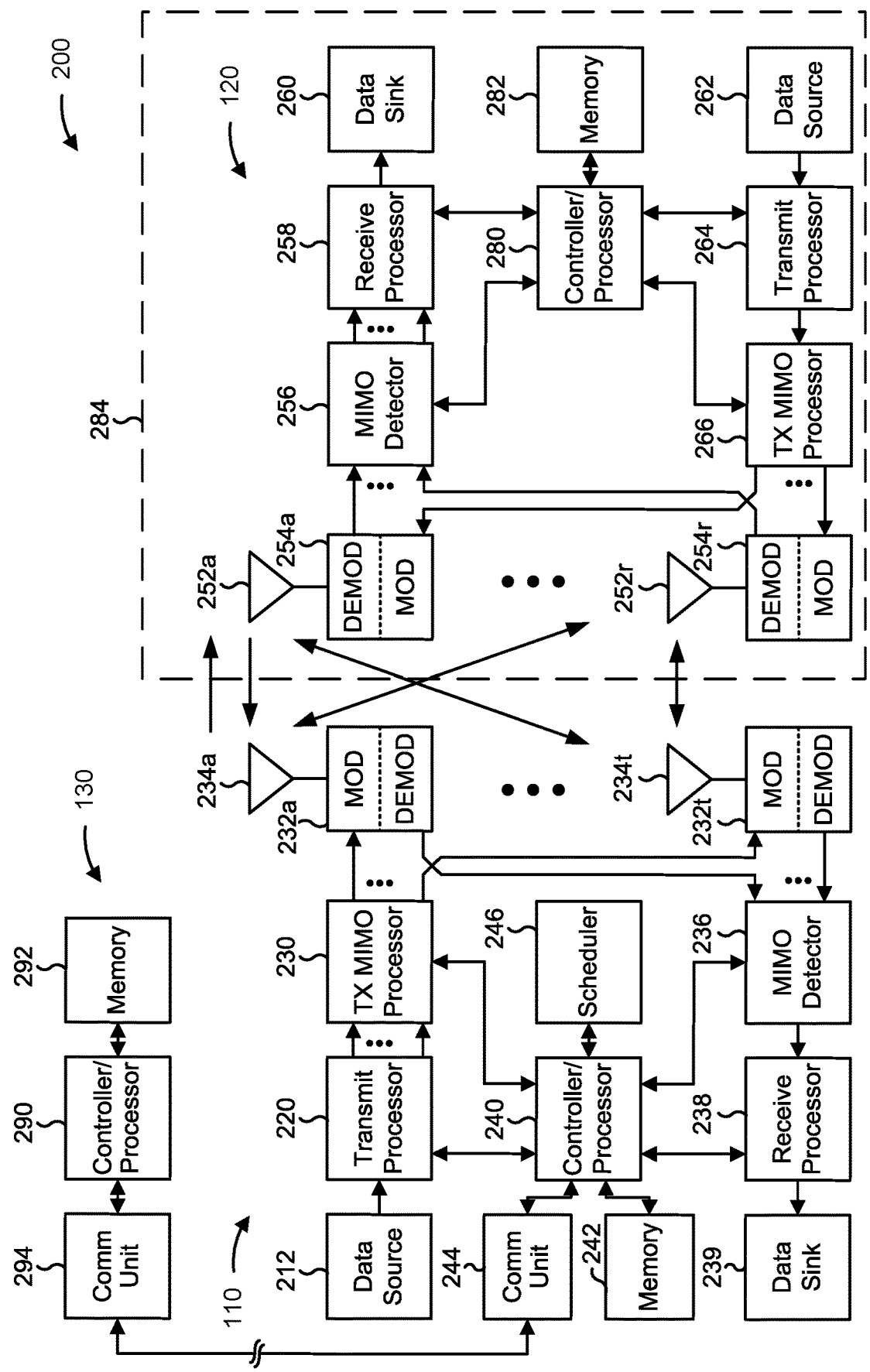
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to 3A-3C, 4, and/or 5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to 3A-3C, 4, and/or 5).

Controller/processor 240 of base station 110, controller/processor 280 of UE 120, and/or any other component(s) of FIG. 2 may perform one or more techniques associated with zone based sidelink time synchronization, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a first UE 120 may include means for determining whether to transmit a sidelink timing synchronization signal to a second UE 120 based at least in part on a sidelink zone in which the first UE 120 is located and a sidelink zone in which the second UE 120 is located, means for selectively transmitting the sidelink timing synchronization signal to the second UE 120 based at least in part on determining whether to transmit the sidelink timing synchronization signal to the second UE 120, and/or the like. In some aspects, a first UE 120 may include means for determining whether a second UE 120 is to transmit a sidelink timing synchronization signal to the first UE 120 based at least in part on a sidelink zone in which the first UE 120 is located and a sidelink zone in which the second UE 120 is located, means for selectively receiving the sidelink timing synchronization signal from the second UE 120 based at least in part on determining whether the second UE 120 is to transmit the sidelink timing synchronization signal to the first UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

As indicated above, in some cases, two or more UEs may communicate directly via a sidelink. For example, a first UE may transmit one or more sidelink communications to a second UE on the sidelink and/or may receive one or more sidelink communications from the second UE on the sidelink. Propagation delay may occur between the first UE and the second UE due to the distance between the first UE and the second UE. The propagation delay of a physical signal carrying a sidelink communication transmitted between the first UE and the second UE may cause the sidelink communication to be received at some time after the sidelink communication was transmitted. Accordingly, the first UE and the second UE may time synchronize to account for the propagation delay between the first UE and the second UE.

In some cases, the usefulness of time synchronization between the first UE and the second UE may be based at least in part on the cyclic prefix duration for the sidelink. The cyclic prefix may be based at least in part on subcarrier spacing on the sidelink. For example, the cyclic prefix duration used by the first UE and the second UE may be around 1 microsecond (µs) for a 60 kilohertz (kHz) subcarrier spacing, may be 0.5 µs for a 120 kHz subcarrier spacing, and/or the like. In some cases, the propagation delay between the first UE and the second UE may be absorbed by the cyclic prefix on the sidelink. However, in other cases, the propagation delay between the first UE and the second UE may be longer than the cyclic prefix on the sidelink, in which cases the first UE and the second UE may use time synchronization to account for the propagation delay.

Some aspects described herein provide techniques and apparatuses for zone based sidelink time synchronization. In some aspects, a geographic area may be partitioned into a plurality of sidelink zones. The sidelink zones may be configured in a manner that permits the approximate distance between the UEs to be determined based at least in part on the sidelink zones in which the UEs are located. In this way, the UEs may use the sidelink zones for time synchronization.

For example, a first UE and a second UE may determine whether transmission of a sidelink timing synchronization signal is to occur based at least in part on the sidelink zone in which the first UE is located and the sidelink zone in which the second UE is located. A table, a standard, a specification, a configuration stored by the first UE and the second UE, and/or another data structure may identify various combinations of sidelink zones and whether a sidelink timing synchronization signal is to be transmitted for each of the combinations of sidelink zones. The combinations of sidelink zones may be configured based at least in part on the distances between sidelink zones included in the combinations of sidelink zones. In this way, sidelink zones that are far apart or are a distance apart that satisfies a distance threshold may be configured for transmission of a sidelink timing synchronization signal. Conversely, sidelink zones that are close together (or the same sidelink zone) may not be configured for transmission of a sidelink timing synchronization signal.

In this way, the first UE and the second UE may identify the combination of the sidelink zone in which the first UE is located and the sidelink zone in which the second UE is located, and may determine whether the combination is configured for transmission of a sidelink timing synchronization signal. This permits the first UE and the second UE to quickly determine whether transmission of a sidelink timing synchronization signal is to occur, permits the first UE and the second UE to time synchronize in particular scenarios while permitting the first UE and the second UE to conserve processing, memory, battery, and radio resources by refraining from time synchronizing in other scenarios, and/or the like.

Figure 3A:
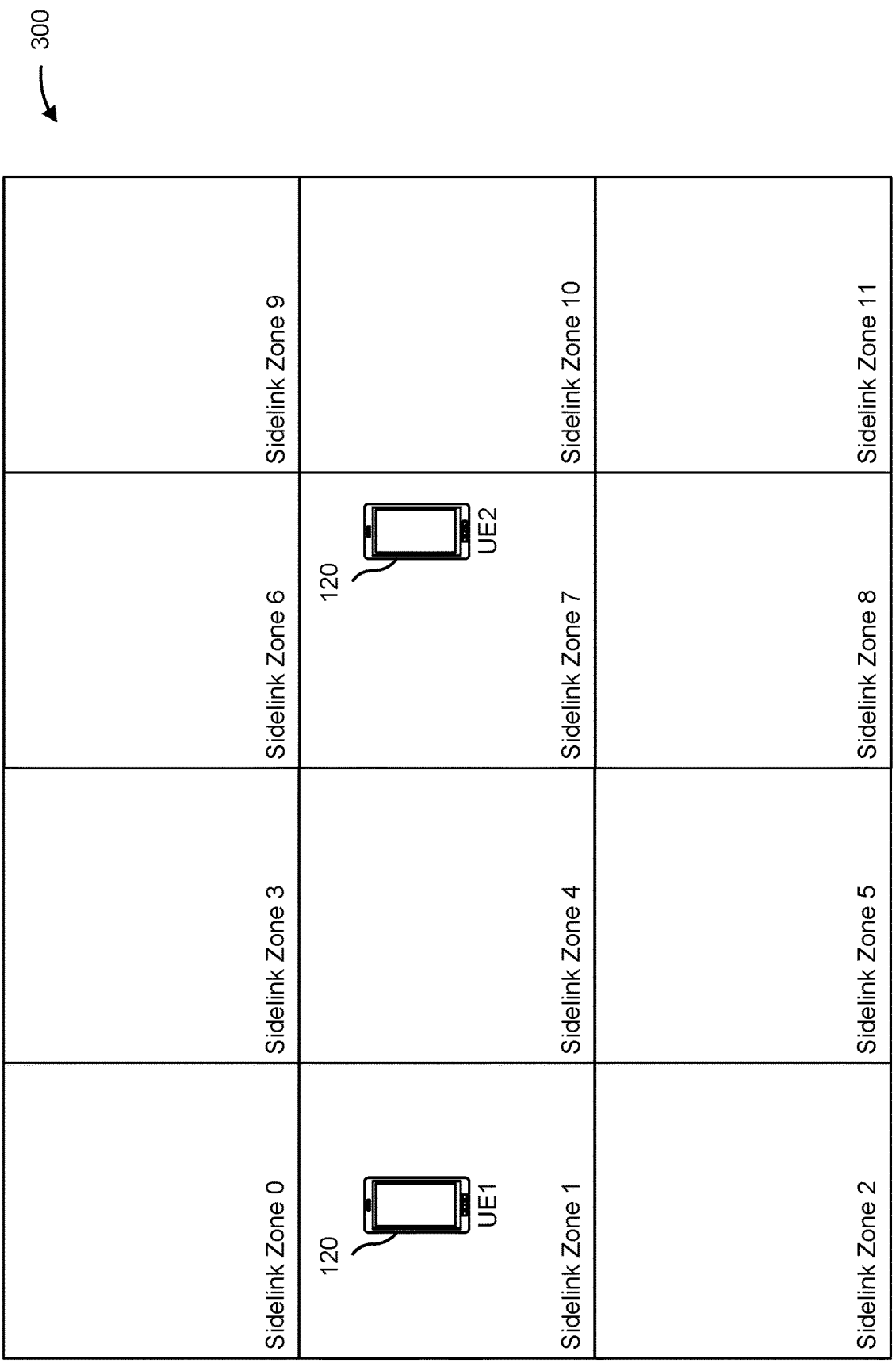
FIGS. 3A-3C are diagrams illustrating examples of zone based sidelink time synchronization, in accordance with the present disclosure.
Figure 3B:
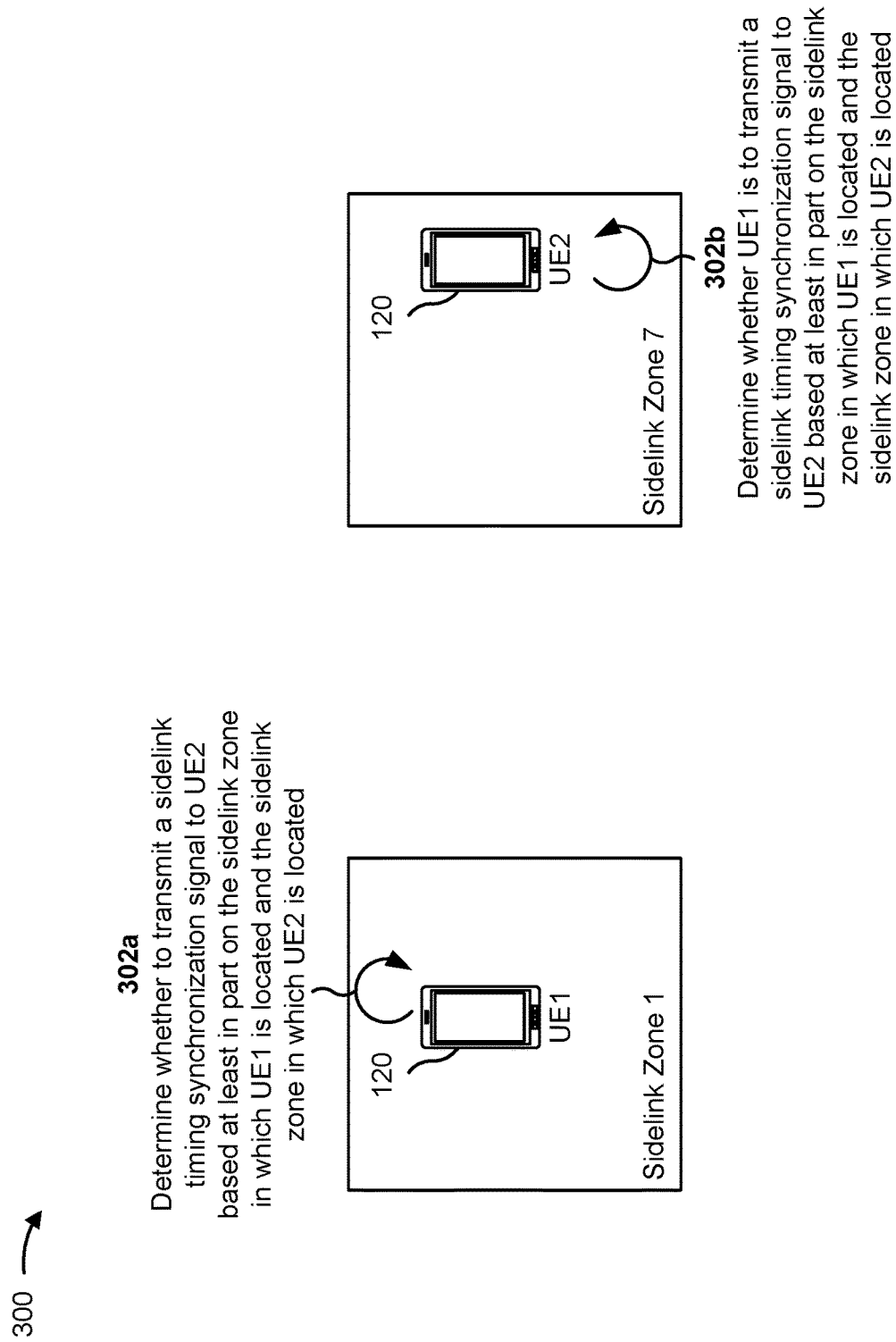
Figure 3C:
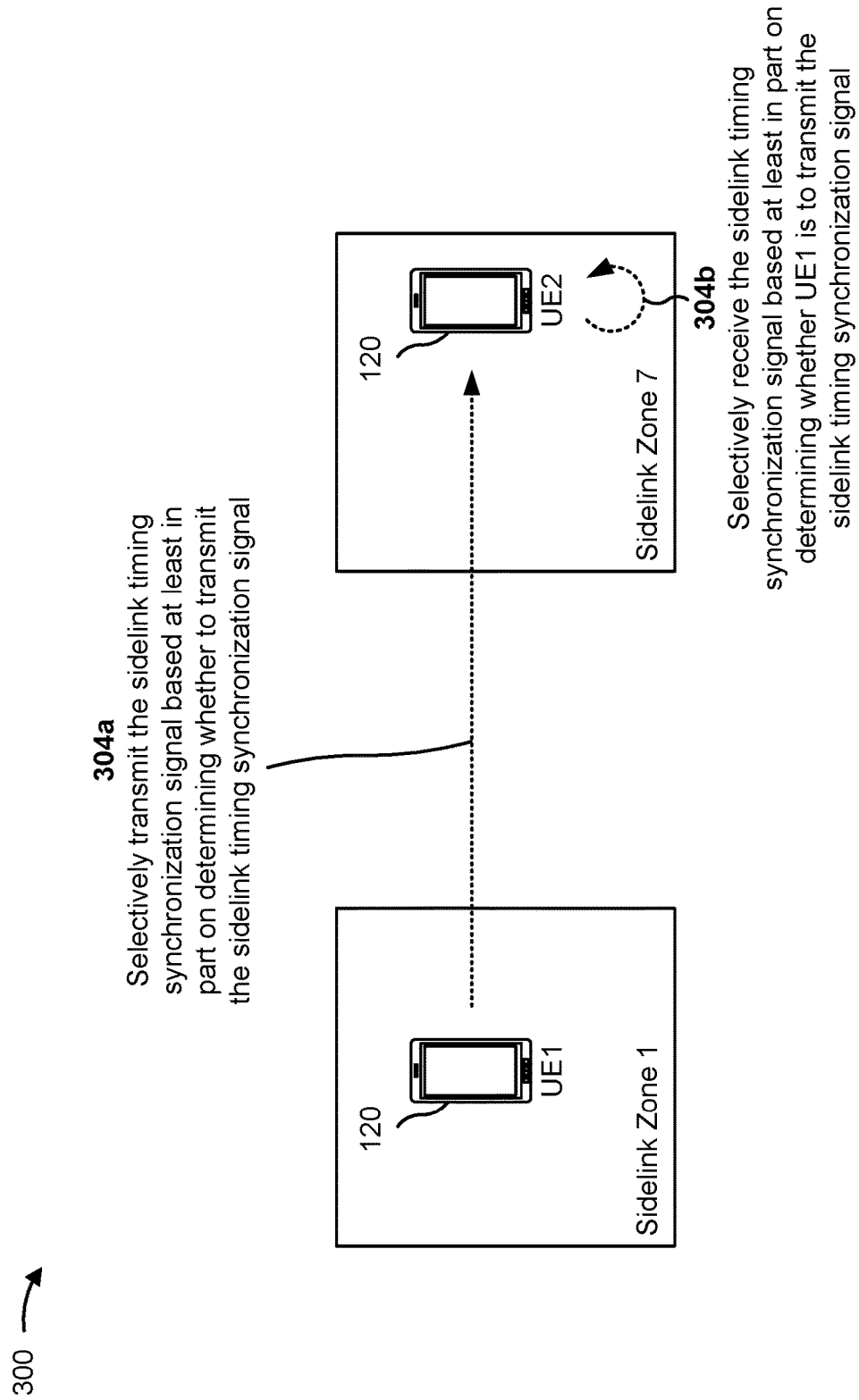

FIGS. 3A-3C are diagrams illustrating one or more examples 300 of zone based sidelink time synchronization, in accordance with various aspects of the present disclosure. As shown in FIGS. 3A-3C, example(s) 300 may include communication between a plurality of UEs, such as UE1 (e.g., a UE 120) and UE2 (e.g., another UE 120). The UEs may communicate via a wireless sidelink. In some aspects, the UEs are included in a wireless network such as wireless network 100. In some aspects, one or more of the UEs are located outside of the coverage area of a wireless network.

As shown in FIG. 3A, a geographic area may be partitioned into a plurality of contiguous sidelink zones. Each of the sidelink zones may be a particular size and shape. In some aspects, the sidelink zones are the same size and shape. In some aspects, the size and/or the shape of at least a subset of the sidelink zones are different. 3A illustrates an example in which the sidelink zones are square shaped and are 50 meters in width. However, sidelink zones may be implemented using many different types of shapes, sizes, and/or configurations other than the size, shape, and configuration illustrated in the example in FIG. 3A.

As further shown in FIG. 3A, each of the sidelink zones may be assigned an identifier such that the sidelink zones may be indexed in a table, a wireless communication standard, a data structure, a wireless communication specification, and/or the like. The identifiers assigned to the sidelink zones may be numbered identifiers (e.g., Sidelink Zone 0 through Sidelink Zone 11), lettered identifiers (e.g., Sidelink Zone A through Sidelink Zone G), or other types of identifiers. In some aspects, the identifiers used for the sidelink zones may repeat after a particular quantity of identifiers are used such that the quantity of identifiers in use may be reduced while still permitting sidelink zones to be uniquely identified within a portion of the geographic area.

The size and shape of each sidelink zone may be a known and well-defined configuration such that use of sidelink zones allows for distance determinations between two UEs. In particular, the distance between two UEs may be determined based at least in part on the quantity of sidelink zones between the two UEs. For example, the distance between UE1 and UE2 illustrated in FIG. 3A may be determined based at least in part on UE1 being located in Sidelink Zone 1 and UE2 being located in Sidelink Zone 7, based at least in part on Sidelink Zone 4 being between Sidelink Zone 1 and Sidelink Zone 7, based at least in part on the size and shape of Sidelink Zones 1, 4, and 7, and/or the like. In some aspects, the ability to determine distances between UEs based at least in part on sidelink zones may be used for timing synchronization between the UEs.

As shown in FIG. 3B, and by reference number 302a, UE1 may determine whether to transmit a sidelink timing synchronization signal to UE2 based at least in part on the sidelink zone in which UE1 is located and the sidelink zone in which UE2 is located. As shown by reference number 302b, UE2 may determine whether UE1 is to transmit a sidelink timing synchronization signal to UE2 based at least in part on the sidelink zone in which UE1 is located and the sidelink zone in which UE2 is located. The sidelink timing synchronization signal (which may also be referred to as a time tracking reference signal) may be a signal that is transmitted for the purpose of determining a propagation delay between two UEs. A UE that receives a sidelink timing synchronization signal may know the time at which the sidelink timing synchronization signal is transmitted, and may determine the propagation delay based at least in part on the time duration between the time that the sidelink timing synchronization signal is transmitted and the time at which the sidelink timing synchronization signal is received.

UE1 and UE2 may determine whether a sidelink timing synchronization signal is to be transmitted at various times and/or based at least in part on various events. For example, UE1 and UE2 may determine whether a sidelink timing synchronization signal is to be transmitted based at least in part on UE1 and UE2 communicatively connecting. As another example, UE1 and UE2 may determine whether a sidelink timing synchronization signal is to be transmitted at a particular time interval. As another example, UE1 and UE2 may determine whether a sidelink timing synchronization signal is to be transmitted based at least in part on UE1 and/or UE2 moving to another sidelink zone.

In some aspects, UE1 determines the sidelink zone in which UE1 is located based at least in part on determining a geographic location of UE1 and identifying the sidelink zone in which the geographic location of UE1 is included. Similarly, UE2 may determine the sidelink zone in which UE2 is located based at least in part on determining a geographic location of UE2 and identifying the sidelink zone in which the geographic location of UE2 is included.

In some aspects, UE1 determines the sidelink zone in which UE2 is located based at least in part on signaling from UE2. For example, UE2 may transmit, to UE1, a sidelink communication identifying the sidelink zone in which UE2 is located. Similarly, UE2 may determine the sidelink zone in which UE1 is located based at least in part on signaling from UE1. In some aspects, UE1 transmits updates to UE2 as to the sidelink zone in which UE1 is located. For example, UE1 may transmit periodic updates, may transmit updates based at least in part on events associated with UE1 (e.g., based at least in part on UE1 moving to a new sidelink zone), and/or the like. UE2 may transmit updates to UE1 in a similar manner.

In some aspects, UE1 and UE2 may determine whether a sidelink timing synchronization signal is to be transmitted based at least in part on the combination of the sidelink zone in which UE1 is located and the sidelink zone in which UE2 is located. In these cases, various combinations of sidelink zones may either be configured with transmission of a sidelink timing synchronization signal or without transmission of a sidelink timing synchronization signal. Accordingly, UE1 may determine whether to transmit a sidelink timing synchronization signal to UE2 based at least in part on whether the combination of the sidelink zone in which UE1 is located and the sidelink zone in which UE2 is located is configured for transmission of a sidelink timing synchronization signal. Similarly, UE2 may determine whether UE1 is to transmit a sidelink timing synchronization signal to UE2 based at least in part on whether the combination of the sidelink zone in which UE1 is located and the sidelink zone in which UE2 is located is configured for transmission of a sidelink timing synchronization signal.

In some aspects, a data structure such as a table, a wireless communication standard, a data structure, a wireless communication specification, and/or another type of data structure may be configured with information identifying a plurality of configured combinations of sidelink zones and information identifying whether a sidelink timing synchronization signal is to be transmitted for each of the configured combinations of sidelink zones. For example, the data structure may include information identifying combinations of Sidelink Zone 0 and Sidelink Zone 1 through Sidelink Zone 0 and Sidelink Zone 11, Sidelink Zone 1 and Sidelink Zone 2 through Sidelink Zone 1 and Sidelink Zone 11, and so on. In these cases, UE1 and UE2 may determine whether a sidelink timing synchronization signal is to be transmitted by identifying, in the data structure, information identifying the combination of the sidelink zone in which UE1 is located and the sidelink zone in which UE2 is located, and determining whether the data structure indicates that a sidelink timing synchronization signal is to be transmitted for the combination.

As shown in FIG. 3C, and by reference number 304a, UE1 may selectively transmit the sidelink timing synchronization signal to UE2 based at least in part on determining whether to transmit the sidelink timing synchronization signal to UE2. As shown by reference number 304b, UE2 may selectively receive the sidelink timing synchronization signal from UE1 based at least in part on determining whether UE1 is to transmit the sidelink timing synchronization signal to UE2.

For example, UE1 may determine to transmit the sidelink timing synchronization signal to UE2, and may transmit the sidelink timing synchronization signal to UE2 based at least in part on determining to transmit the sidelink timing synchronization signal to UE2. UE2 may determine that UE1 is to transmit the sidelink timing synchronization signal to UE2, and may monitor for and receive the sidelink timing synchronization signal from UE1 based at least in part on determining that UE1 is to transmit the sidelink timing synchronization signal to UE2. In these cases, UE1 and UE2 may use the sidelink timing synchronization signal to time synchronize transmission and reception on the sidelink.

As another example, UE1 may determine to refrain from transmitting the sidelink timing synchronization signal to UE2, and may refrain from transmitting the sidelink timing synchronization signal to UE2 based at least in part on determining to refrain from transmitting the sidelink timing synchronization signal to UE2. UE2 may determine that UE1 is to refrain from transmitting the sidelink timing synchronization signal to UE2, and may refrain from monitoring for and receiving the sidelink timing synchronization signal from UE1 based at least in part on determining that UE1 is to refrain from transmitting the sidelink timing synchronization signal to UE2. In these cases, UE1 and UE2 may refrain from using a sidelink timing synchronization signal, which conserves processing, memory, battery, and radio resources of UE1 and UE2.

In some aspects, if UE1 and UE2 determine that a sidelink timing synchronization signal is to be transmitted, UE1 and UE2 may identify one or more parameters for transmission of the sidelink timing synchronization signal. UE1 may transmit the sidelink timing synchronization signal based at least in part on the one or more parameters. UE2 may receive (e.g., monitor for, identify, demodulate, decode, and/or the like) the sidelink timing synchronization signal based at least in part on the one or more parameters.

For example, the one or more parameters may indicate a bandwidth (e.g., a frequency bandwidth) of the sidelink timing synchronization signal. In these cases, UE1 may transmit the sidelink timing synchronization signal in the bandwidth indicated by the one or more parameters. Moreover, UE2 may monitor for the sidelink timing synchronization signal in the bandwidth indicated by the one or more parameters.

As another example, the one or more parameters may indicate a quantity of repetitions of the sidelink timing synchronization signal. In these cases, UE1 may transmit the quantity of repetitions of the sidelink timing synchronization signal indicated by the one or more parameters. Moreover, UE2 may monitor for, demodulate, and decode the quantity of repetitions of the sidelink timing synchronization signal indicated by the one or more parameters.

As another example, the one or more parameters may indicate a waveform type of the sidelink timing synchronization signal. The waveform type of the sidelink timing synchronization signal may include a multi-carrier waveform (e.g., a universal filtered multicarrier (UFMC) waveform, a cyclic prefix orthogonal frequency division multiplexing (CP-OFDM) waveform, a filter bank multi-carrier (FBMC) waveform, a generalized frequency division multiplexing (GFDM) waveform, and/or the like), a single-carrier waveform (e.g., single-carrier quadrature amplitude modulation (SC-QAM) waveform, a single-carrier frequency division multiplexing (SC-FDM) waveform, and/or the like), or another waveform type. In these cases, UE1 may transmit the sidelink timing synchronization signal using the waveform type indicated by the one or more parameters. Moreover, UE2 may demodulate and/or decode the sidelink timing synchronization signal based at least in part on the waveform type indicated by the one or more parameters.

As another example, the one or more parameters may indicate a time domain pattern and/or a frequency domain pattern for the sidelink timing synchronization signal. The time domain pattern may indicate a resource element or symbol spacing in the time domain for the sidelink timing synchronization signal, may identify the time domain resources for the sidelink timing synchronization signal, and/or the like. The frequency domain pattern may indicate a resource element spacing in the frequency domain for the sidelink timing synchronization signal, may identify the frequency domain resources for the sidelink timing synchronization signal, and/or the like. In these cases, UE1 may transmit the sidelink timing synchronization signal based at least in part on the time domain pattern and/or the frequency domain pattern in the indicated by the one or more parameters. Moreover, UE2 may monitor for, demodulate, and decode the sidelink timing synchronization signal based at least in part on the time domain pattern and/or the frequency domain pattern in the indicated by the one or more parameters.

As another example, the one or more parameters may indicate a sequence length for the sidelink timing synchronization signal. In these cases, UE1 may encode, modulate, and transmit the sidelink timing synchronization signal based at least in part on the sequence length indicated by the one or more parameters. Moreover, UE2 may demodulate and decode the sidelink timing synchronization signal based at least in part on the sequence length indicated by the one or more parameters.

As another example, the one or more parameters may indicate a root sequence for the sidelink timing synchronization signal. The root sequence may include a Zadoff-Chu root sequence, a Gold root sequence, a binary sequence or another type of sequence. In these cases, UE1 may encode, modulate, and transmit the sidelink timing synchronization signal based at least in part on the root sequence indicated by the one or more parameters. Moreover, UE2 may demodulate and decode the sidelink timing synchronization signal based at least in part on the root sequence indicated by the one or more parameters.

As another example, the one or more parameters may indicate a cyclic shift for the sidelink timing synchronization signal. The cyclic shift may be used to shift a root sequence for the sidelink timing synchronization signal to maintain orthogonality between different transmission of the sidelink timing synchronization signal and/or between the transmission of the sidelink timing synchronization signal and other sidelink transmissions. In these cases, UE1 may encode, modulate, and transmit the sidelink timing synchronization signal based at least in part on the cyclic shift indicated by the one or more parameters. Moreover, UE2 may demodulate and decode the sidelink timing synchronization signal based at least in part on the cyclic shift indicated by the one or more parameters.

As another example, the one or more parameters may indicate which UE of UE1 and UE2 is to transmit the sidelink timing synchronization signal. For example, the one or more parameters may indicate that the UE in the sidelink zone with the lowest sidelink zone identifier is to transmit the sidelink timing synchronization signal. As another example, the one or more parameters may indicate that the UE located in a particular sidelink zone is to transmit the sidelink timing synchronization signal. As another example, the one or more parameters may indicate that both UEs are to transmit the sidelink timing synchronization signal.

In some aspects, the one or more parameters for the sidelink timing synchronization signal may be configured for different configured combinations of sidelink zones. In this way, each configured combination of sidelink zones may be configured with a particular combination of parameters for the sidelink timing synchronization signal to account for distance between the sidelink zones in the configured combination, channel conditions in and between the sidelink zones in the configured combination, and/or other factors.

In some aspects, the combination of parameters for each configured combination of sidelink zones is identified in a data structure (e.g., the data structure described above or another data structure), such as a table, a wireless communication standard, a wireless communication specification, a configuration stored by UE1 and UE2, and/or the like. Accordingly, UE1 and UE2 may identify the particular combination of parameters for the sidelink timing synchronization signal to be transmitted between UE1 and UE2 based at least in part on the combination of the sidelink zone in which UE1 is located and the sidelink zone in which UE2 is located. For example, UE1 and UE2 may identify, in the data structure, information identifying the combination of the sidelink zone in which UE1 is located and the sidelink zone in which UE2 is located, and may identify the particular combination of parameters for the sidelink timing synchronization signal associated with the combination in the data structure.

In this way, UE1 and UE2 may identify the combination of the sidelink zone in which UE1 is located and the sidelink zone in which UE2 is located, and may determine whether the combination is configured for transmission of a sidelink timing synchronization signal. This permits UE1 and UE2 to quickly determine whether transmission of a sidelink timing synchronization signal is to occur, permits UE1 and UE2 to time synchronize in particular scenarios while permitting UE1 and UE2 to conserve processing, memory, battery, and radio resources by refraining from time synchronizing in other scenarios, and/or the like.

As indicated above, FIGS. 3A-3C are provided as one or more examples. Other examples may differ from what is described with respect to FIGS. 3A-3C.

Figure 4:
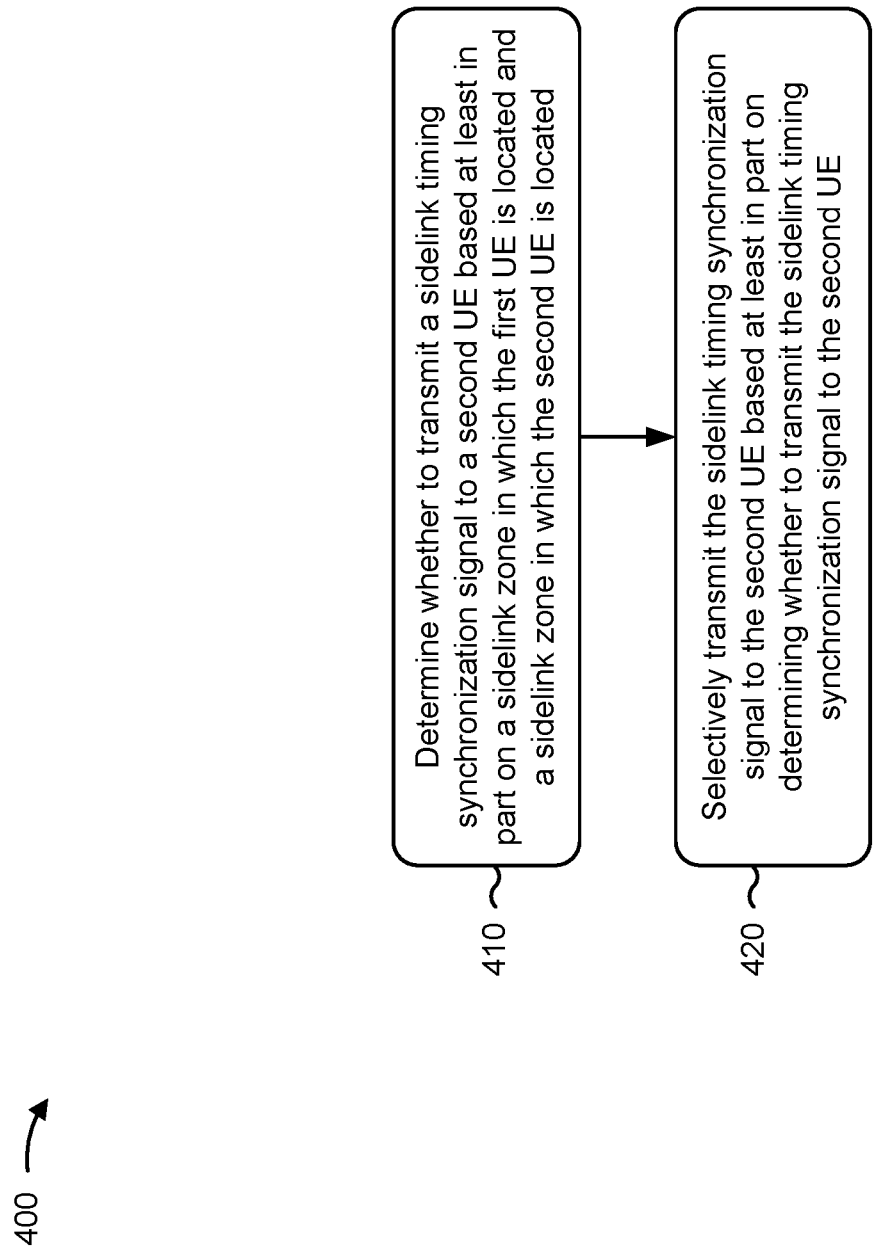
FIGS. 4 and 5 are diagrams illustrating example processes performed, for example, by a UE, in accordance with the present disclosure.

FIG. 4 is a diagram illustrating an example process 400 performed, for example, by a first UE, in accordance with various aspects of the present disclosure. Example process 400 is an example where the first UE (e.g., UE 120 illustrated and described above in one or more of FIGS. 1, 2, and/or 3A-3C, and/or the like) performs operations associated with zone based sidelink time synchronization.

As shown in FIG. 4, in some aspects, process 400 may include determining whether to transmit a sidelink timing synchronization signal to a second UE based at least in part on a sidelink zone in which the first UE is located and a sidelink zone in which the second UE is located (block 410). For example, the first UE (e.g., using receive processor 258, transmit processor 264, controller/processor 280, memory 282, and/or the like) may determine whether to transmit a sidelink timing synchronization signal to a second UE based at least in part on a sidelink zone in which the first UE is located and a sidelink zone in which the second UE is located, as described above.

As further shown in FIG. 4, in some aspects, process 400 may include selectively transmitting the sidelink timing synchronization signal to the second UE based at least in part on determining whether to transmit the sidelink timing synchronization signal to the second UE (block 420). For example, the first UE (e.g., using receive processor 258, transmit processor 264, controller/processor 280, memory 282, and/or the like) may selectively transmit the sidelink timing synchronization signal to the second UE based at least in part on determining whether to transmit the sidelink timing synchronization signal to the second UE, as described above.

Process 400 may include additional aspects, such as any single aspect or any combination of aspects described below and/or in connection with one or more other processes described elsewhere herein.

In a first aspect, process 400 includes determining one or more parameters for the sidelink timing synchronization signal based at least in part on the sidelink zone in which the first UE is located and the sidelink zone in which the second UE is located. In a second aspect, alone or in combination with the first aspect, the one or more parameters for the sidelink timing synchronization signal comprise at least one of a bandwidth of the sidelink timing synchronization signal, a quantity of repetitions of the sidelink timing synchronization signal, a waveform type of the sidelink timing synchronization signal, a time domain pattern of the sidelink timing synchronization signal, a frequency domain pattern of the sidelink timing synchronization signal, a sequence length of the sidelink timing synchronization signal, a root sequence of the sidelink timing synchronization signal, or a cyclic shift of the sidelink timing synchronization signal.

In a third aspect, alone or in combination with one or more of the first and second aspects, determining the one or more parameters for the sidelink timing synchronization signal comprises identifying a combination of the sidelink zone in which the first UE is located and the sidelink zone in which the second UE is located from a plurality of configured combinations of sidelink zones, and identifying a particular combination of the one or more parameters for the sidelink timing synchronization signal associated with the combination. In a fourth aspect, alone or in combination with one or more of the first through third aspects, identifying the particular combination of the one or more parameters for the sidelink timing synchronization signal associated with the combination comprises identifying the particular combination of the one or more parameters for the sidelink timing synchronization signal based at least in part on at least one of a table, a standard, a specification, or a configuration stored by the first UE.

In a fifth aspect, alone or in combination with one or more of the first through fourth aspects, determining whether to transmit the sidelink timing synchronization signal to the second UE comprises: identifying a combination of the sidelink zone in which the first UE is located and the sidelink zone in which the second UE is located from a plurality of configured combinations of sidelink zones, and determining whether to transmit the sidelink timing synchronization signal to the second UE based at least in part on whether transmission of the sidelink timing synchronization signal is configured for the combination. In a sixth aspect, alone or in combination with one or more of the first through fifth aspects, process 400 includes determining whether transmission of the sidelink timing synchronization signal is configured for the combination based at least in part on at least one of a table, a standard, a specification, or a configuration is storing by the first UE.

In a seventh aspect, alone or in combination with one or more of the first through sixth aspects, determining whether to transmit the sidelink timing synchronization signal to the second UE comprises determining to transmit the sidelink timing synchronization signal to the second UE, and selectively transmitting the sidelink timing synchronization signal to the second UE comprises transmitting the sidelink timing synchronization signal to the second UE based at least in part on determining to transmit the sidelink timing synchronization signal to the second UE. In an eighth aspect, alone or in combination with one or more of the first through seventh aspects, determining whether to transmit the sidelink timing synchronization signal to the second UE comprises determining to refrain from transmitting the sidelink timing synchronization signal to the second UE, and selectively transmitting the sidelink timing synchronization signal to the second UE comprises refraining from transmitting the sidelink timing synchronization signal to the second UE based at least in part on determining to refrain from transmitting the sidelink timing synchronization signal to the second UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
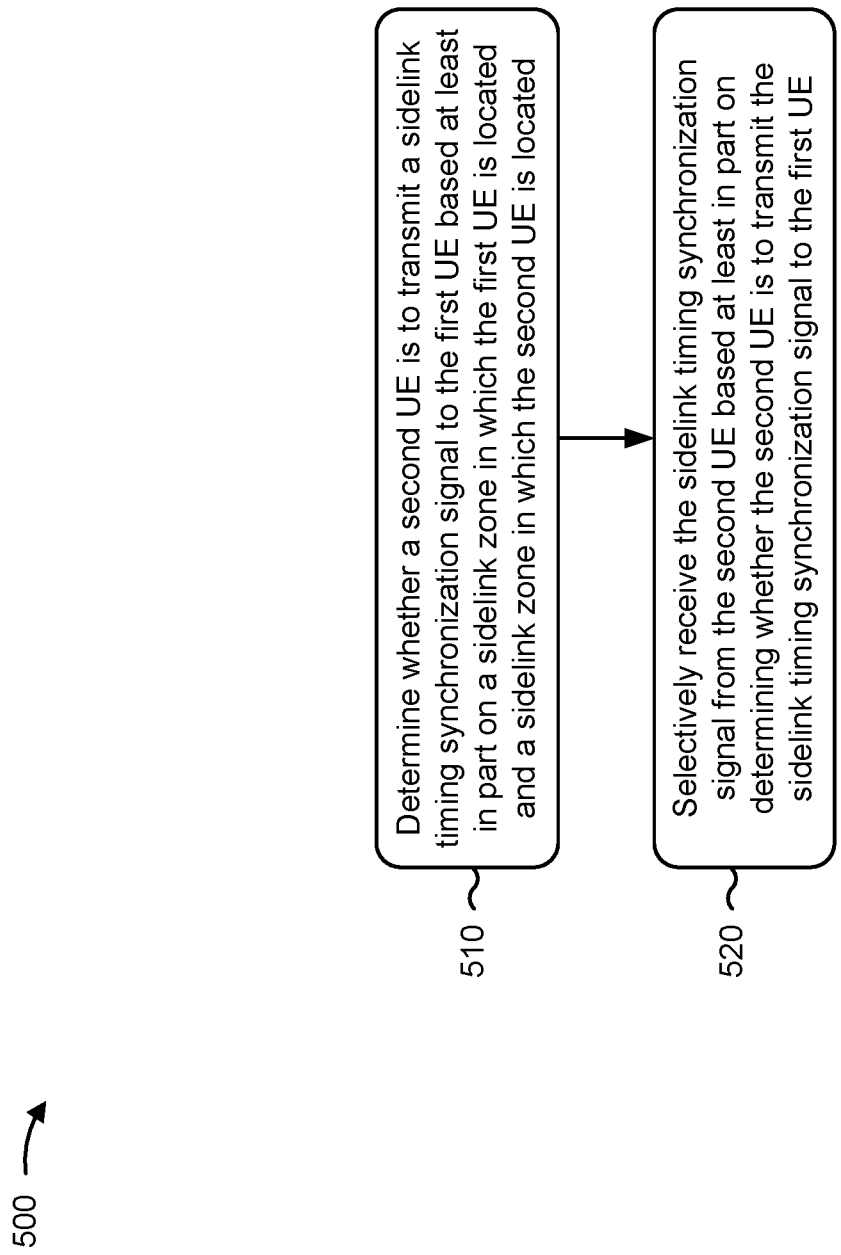

FIG. 5 is a diagram illustrating an example process 500 performed, for example, by a first UE, in accordance with various aspects of the present disclosure. Example process 500 is an example where the first UE (e.g., UE 120 illustrated and described above in one or more of FIGS. 1, 2, and/or 3A-3C, and/or the like) performs operations associated with zone based sidelink time synchronization.

As shown in FIG. 5, in some aspects, process 500 may include determining whether a second UE is to transmit a sidelink timing synchronization signal to the first UE based at least in part on a sidelink zone in which the first UE is located and a sidelink zone in which the second UE is located (block 510). For example, the first UE (e.g., using receive processor 258, transmit processor 264, controller/processor 280, memory 282, and/or the like) may determine whether a second UE is to transmit a sidelink timing synchronization signal to the first UE based at least in part on a sidelink zone in which the first UE is located and a sidelink zone in which the second UE is located, as described above.

As further shown in FIG. 5, in some aspects, process 500 may include selectively receiving the sidelink timing synchronization signal from the second UE based at least in part on determining whether the second UE is to transmit the sidelink timing synchronization signal to the first UE (block 520). For example, the first UE (e.g., using receive processor 258, transmit processor 264, controller/processor 280, memory 282, and/or the like) may selectively receive the sidelink timing synchronization signal from the second UE based at least in part on determining whether the second UE is to transmit the sidelink timing synchronization signal to the first UE, as described above.

Process 500 may include additional aspects, such as any single aspect or any combination of aspects described below and/or in connection with one or more other processes described elsewhere herein.

In a first aspect, process 500 includes determining one or more parameters for the sidelink timing synchronization signal based at least in part on the sidelink zone in which the first UE is located and the sidelink zone in which the second UE is located. In a second aspect, alone or in combination with the first aspect, the one or more parameters for the sidelink timing synchronization signal comprise at least one of a bandwidth of the sidelink timing synchronization signal, a quantity of repetitions of the sidelink timing synchronization signal, a waveform type of the sidelink timing synchronization signal, a time domain pattern of the sidelink timing synchronization signal, a frequency domain pattern of the sidelink timing synchronization signal, a sequence length of the sidelink timing synchronization signal, a root sequence of the sidelink timing synchronization signal, or a cyclic shift of the sidelink timing synchronization signal.

In a third aspect, alone or in combination with one or more of the first and second aspects, determining the one or more parameters for the sidelink timing synchronization signal comprises identifying a combination of the sidelink zone in which the first UE is located and the sidelink zone in which the second UE is located from a plurality of configured combinations of sidelink zones, and identifying a particular combination of the one or more parameters for the sidelink timing synchronization signal associated with the combination. In a fourth aspect, alone or in combination with one or more of the first through third aspects, identifying the particular combination of the one or more parameters for the sidelink timing synchronization signal associated with the combination comprises identifying the particular combination of the one or more parameters for the sidelink timing synchronization signal based at least in part on at least one of: a table, a standard, a specification, or a configuration stored by the first UE.

In a fifth aspect, alone or in combination with one or more of the first through fourth aspects, determining whether the second UE is to transmit the sidelink timing synchronization signal to the first UE comprises identifying a combination of the sidelink zone in which the first UE is located and the sidelink zone in which the second UE is located from a plurality of configured combinations of sidelink zones, and determining whether the second UE is to transmit the sidelink timing synchronization signal to the first UE based at least in part on whether transmission of the sidelink timing synchronization signal is configured for the combination. In a sixth aspect, alone or in combination with one or more of the first through fifth aspects, process 500 includes determining whether transmission of the sidelink timing synchronization signal is configured for the combination based at least in part on at least one of: a table, a standard, a specification, or a configuration is storing by the first UE.

In a seventh aspect, alone or in combination with one or more of the first through sixth aspects, determining whether the second UE is to transmit the sidelink timing synchronization signal to the first UE comprises determining that the second UE is to transmit the sidelink timing synchronization signal to the first UE, and selectively receiving the sidelink timing synchronization signal from the second UE comprises: receiving the sidelink timing synchronization signal from the second UE based at least in part on determining that the second UE is to transmit the sidelink timing synchronization signal to the first UE. In an eighth aspect, alone or in combination with one or more of the first through seventh aspects, determining whether the second UE is to transmit the sidelink timing synchronization signal to the first UE comprises determining that the second UE is to refrain from transmitting the sidelink timing synchronization signal to the first UE, and selectively receiving the sidelink timing synchronization signal from the second UE comprises refraining from receiving the sidelink timing synchronization signal from the second UE based at least in part on determining that the second UE is to refrain from transmitting the sidelink timing synchronization signal to the first UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a first user equipment (UE), comprising: determining whether to transmit a sidelink timing synchronization signal to a second UE based at least in part on a sidelink zone in which the first UE is located and a sidelink zone in which the second UE is located; and selectively transmitting the sidelink timing synchronization signal to the second UE based at least in part on determining whether to transmit the sidelink timing synchronization signal to the second UE.

Aspect 2: The method of Aspect 1, further comprising: determining one or more parameters for the sidelink timing synchronization signal based at least in part on the sidelink zone in which the first UE is located and the sidelink zone in which the second UE is located. Aspect 3: The method of Aspect 2, wherein the one or more parameters for the sidelink timing synchronization signal comprise at least one of: a bandwidth of the sidelink timing synchronization signal, a quantity of repetitions of the sidelink timing synchronization signal, a waveform type of the sidelink timing synchronization signal, a time domain pattern of the sidelink timing synchronization signal, a frequency domain pattern of the sidelink timing synchronization signal, a sequence length of the sidelink timing synchronization signal, a root sequence of the sidelink timing synchronization signal, or a cyclic shift of the sidelink timing synchronization signal.

Aspect 4: The method of Aspect 2 or 3, wherein determining the one or more parameters for the sidelink timing synchronization signal comprises: identifying a combination of the sidelink zone in which the first UE is located and the sidelink zone in which the second UE is located from a plurality of configured combinations of sidelink zones; and identifying a particular combination of the one or more parameters for the sidelink timing synchronization signal associated with the combination. Aspect 5: The method of Aspect 4, wherein identifying the particular combination of the one or more parameters for the sidelink timing synchronization signal associated with the combination comprises: identifying the particular combination of the one or more parameters for the sidelink timing synchronization signal based at least in part on at least one of: a table, a standard, a specification, or a configuration stored by the first UE.

Aspect 6: The method of any of Aspects 1-5, wherein determining whether to transmit the sidelink timing synchronization signal to the second UE comprises: identifying a combination of the sidelink zone in which the first UE is located and the sidelink zone in which the second UE is located from a plurality of configured combinations of sidelink zones; and determining whether to transmit the sidelink timing synchronization signal to the second UE based at least in part on whether transmission of the sidelink timing synchronization signal is configured for the combination.

Aspect 7: The method of Aspect 6, further comprising: determining whether transmission of the sidelink timing synchronization signal is configured for the combination based at least in part on at least one of: a table, a standard, a specification, or a configuration stored by the first UE. Aspect 8: The method of any of Aspects 1-7, wherein determining whether to transmit the sidelink timing synchronization signal to the second UE comprises: determining to transmit the sidelink timing synchronization signal to the second UE; and wherein selectively transmitting the sidelink timing synchronization signal to the second UE comprises: transmitting the sidelink timing synchronization signal to the second UE based at least in part on determining to transmit the sidelink timing synchronization signal to the second UE.

Aspect 9: The method of any of Aspects 1-8, wherein determining whether to transmit the sidelink timing synchronization signal to the second UE comprises: determining to refrain from transmitting the sidelink timing synchronization signal to the second UE; and wherein selectively transmitting the sidelink timing synchronization signal to the second UE comprises: refraining from transmitting the sidelink timing synchronization signal to the second UE based at least in part on determining to refrain from transmitting the sidelink timing synchronization signal to the second UE.

Aspect 10: A method of wireless communication performed by a first user equipment (UE), comprising: determining whether a second UE is to transmit a sidelink timing synchronization signal to the first UE based at least in part on a sidelink zone in which the first UE is located and a sidelink zone in which the second UE is located; and selectively receiving the sidelink timing synchronization signal from the second UE based at least in part on determining whether the second UE is to transmit the sidelink timing synchronization signal to the first UE.

Aspect 11: The method of Aspect 10, further comprising: determining one or more parameters for the sidelink timing synchronization signal based at least in part on the sidelink zone in which the first UE is located and the sidelink zone in which the second UE is located. Aspect 12: The method of Aspect 11, wherein the one or more parameters for the sidelink timing synchronization signal comprise at least one of: a bandwidth of the sidelink timing synchronization signal, a quantity of repetitions of the sidelink timing synchronization signal, a waveform type of the sidelink timing synchronization signal, a time domain pattern of the sidelink timing synchronization signal, a frequency domain pattern of the sidelink timing synchronization signal, a sequence length of the sidelink timing synchronization signal, a root sequence of the sidelink timing synchronization signal, or a cyclic shift of the sidelink timing synchronization signal.

Aspect 13: The method of Aspect 11 or 12, wherein determining the one or more parameters for the sidelink timing synchronization signal comprises: identifying a combination of the sidelink zone in which the first UE is located and the sidelink zone in which the second UE is located from a plurality of configured combinations of sidelink zones; and identifying a particular combination of the one or more parameters for the sidelink timing synchronization signal associated with the combination. Aspect 14: The method of Aspect 13, wherein identifying the particular combination of the one or more parameters for the sidelink timing synchronization signal associated with the combination comprises: identifying the particular combination of the one or more parameters for the sidelink timing synchronization signal based at least in part on at least one of: a table, a standard, a specification, or a configuration stored by the first UE.

Aspect 15: The method of any of Aspects 10-14, wherein determining whether the second UE is to transmit the sidelink timing synchronization signal to the first UE comprises: identifying a combination of the sidelink zone in which the first UE is located and the sidelink zone in which the second UE is located from a plurality of configured combinations of sidelink zones; and determining whether the second UE is to transmit the sidelink timing synchronization signal to the first UE based at least in part on whether transmission of the sidelink timing synchronization signal is configured for the combination. Aspect 16: The method of Aspect 15, further comprising: determining whether transmission of the sidelink timing synchronization signal is configured for the combination based at least in part on at least one of: a table, a standard, a specification, or a configuration stored by the first UE.

Aspect 17: The method of any of Aspects 10-16, wherein determining whether the second UE is to transmit the sidelink timing synchronization signal to the first UE comprises: determining that the second UE is to transmit the sidelink timing synchronization signal to the first UE; and wherein selectively receiving the sidelink timing synchronization signal from the second UE comprises: receiving the sidelink timing synchronization signal from the second UE based at least in part on determining that the second UE is to transmit the sidelink timing synchronization signal to the first UE. Aspect 18: The method of any of Aspects 10-17, wherein determining whether the second UE is to transmit the sidelink timing synchronization signal to the first UE comprises: determining that the second UE is to refrain from transmitting the sidelink timing synchronization signal to the first UE; and wherein selectively receiving the sidelink timing synchronization signal from the second UE comprises: refraining from receiving the sidelink timing synchronization signal from the second UE based at least in part on determining that the second UE is to refrain from transmitting the sidelink timing synchronization signal to the first UE.

Aspect 19: An apparatus for wireless communication at a device, comprising a processor; memory coupled with the processor; and instructions stored in the memory and executable by the processor to cause the apparatus to perform the method of one or more of Aspects 1-9. Aspect 20: A device for wireless communication, comprising a memory and one or more processors coupled to the memory, the memory and the one or more processors configured to perform the method of one or more of Aspects 1-9.

Aspect 21: An apparatus for wireless communication, comprising at least one means for performing the method of one or more of Aspects 1-9. Aspect 22: A non-transitory computer-readable medium storing code for wireless communication, the code comprising instructions executable by a processor to perform the method of one or more of Aspects 1-9. Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18. Aspect 25: A device for wireless communication, comprising a memory and one or more processors coupled to the memory, the memory and the one or more processors configured to perform the method of one or more of Aspects 10-18.

Aspect 26: An apparatus for wireless communication, comprising at least one means for performing the method of one or more of Aspects 10-18. Aspect 27: A non-transitory computer-readable medium storing code for wireless communication, the code comprising instructions executable by a processor to perform the method of one or more of Aspects 10-18. Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   determining a sidelink zone in which the first UE is located and a sidelink zone in which a second UE is located;
   determining whether to transmit a sidelink timing synchronization signal to the second UE based at least in part on the sidelink zone in which the first UE is located and the sidelink zone in which the second UE is located; and
   selectively transmitting the sidelink timing synchronization signal to the second UE based at least in part on determining whether to transmit the sidelink timing synchronization signal to the second UE.

2. The method of claim 1, further comprising:
   determining one or more parameters for the sidelink timing synchronization signal based at least in part on the sidelink zone in which the first UE is located and the sidelink zone in which the second UE is located.

3. The method of claim 2, wherein the one or more parameters for the sidelink timing synchronization signal comprise at least one of:
   a bandwidth of the sidelink timing synchronization signal,
   a quantity of repetitions of the sidelink timing synchronization signal,
   a waveform type of the sidelink timing synchronization signal,
   a time domain pattern of the sidelink timing synchronization signal,
   a frequency domain pattern of the sidelink timing synchronization signal,
   a sequence length of the sidelink timing synchronization signal,
   a root sequence of the sidelink timing synchronization signal, or
   a cyclic shift of the sidelink timing synchronization signal.

4. The method of claim 2, wherein determining the one or more parameters for the sidelink timing synchronization signal comprises:
   identifying a combination of the sidelink zone in which the first UE is located and the sidelink zone in which the second UE is located from a plurality of configured combinations of sidelink zones; and
   identifying a particular combination of the one or more parameters for the sidelink timing synchronization signal associated with the combination.

5. The method of claim 4, wherein identifying the particular combination of the one or more parameters for the sidelink timing synchronization signal associated with the combination comprises:
   identifying the particular combination of the one or more parameters for the sidelink timing synchronization signal based at least in part on at least one of:
   a table,
   a standard,
   a specification, or
   a configuration stored by the first UE.

6. The method of claim 1, wherein determining whether to transmit the sidelink timing synchronization signal to the second UE comprises:
   identifying a combination of the sidelink zone in which the first UE is located and the sidelink zone in which the second UE is located from a plurality of configured combinations of sidelink zones; and
   determining whether to transmit the sidelink timing synchronization signal to the second UE based at least in part on whether transmission of the sidelink timing synchronization signal is configured for the combination.

7. The method of claim 6, further comprising:
   determining whether transmission of the sidelink timing synchronization signal is configured for the combination based at least in part on at least one of:
   a table,
   a standard,
   a specification, or
   a configuration stored by the first UE.

8. The method of claim 1, wherein determining whether to transmit the sidelink timing synchronization signal to the second UE comprises:

determining to transmit the sidelink timing synchronization signal to the second UE; and
wherein selectively transmitting the sidelink timing synchronization signal to the second UE comprises:
transmitting the sidelink timing synchronization signal to the second UE based at least in part on determining to transmit the sidelink timing synchronization signal to the second UE.

9. The method of claim 1, wherein determining whether to transmit the sidelink timing synchronization signal to the second UE comprises:
determining to refrain from transmitting the sidelink timing synchronization signal to the second UE; and
wherein selectively transmitting the sidelink timing synchronization signal to the second UE comprises:
refraining from transmitting the sidelink timing synchronization signal to the second UE based at least in part on determining to refrain from transmitting the sidelink timing synchronization signal to the second UE.

10. A first user equipment (UE) for wireless communication, comprising:
a memory; and
one or more processors coupled to the memory, the one or more processors configured to cause the UE to:
determine a sidelink zone in which the first UE is located and a sidelink zone in which a second UE is located;
determine whether to transmit a sidelink timing synchronization signal to the second UE based at least in part on the sidelink zone in which the first UE is located and the sidelink zone in which the second UE is located; and
selectively transmit the sidelink timing synchronization signal to the second UE based at least in part on determining whether to transmit the sidelink timing synchronization signal to the second UE.

11. The first UE of claim 10, wherein the one or more processors are further configured to cause the UE to:
determine one or more parameters for the sidelink timing synchronization signal based at least in part on the sidelink zone in which the first UE is located and the sidelink zone in which the second UE is located.

12. The first UE of claim 11, wherein the one or more processors, to cause the UE to determine the one or more parameters for the sidelink timing synchronization signal, are configured to cause the UE to:
identify a combination of the sidelink zone in which the first UE is located and the sidelink zone in which the second UE is located from a plurality of configured combinations of sidelink zones; and
identify a particular combination of the one or more parameters for the sidelink timing synchronization signal associated with the combination.

13. The first UE of claim 10, wherein the one or more processors, to cause the UE to determine whether to transmit the sidelink timing synchronization signal to the second UE, are configured to cause the UE to:
identify a combination of the sidelink zone in which the first UE is located and the sidelink zone in which the second UE is located from a plurality of configured combinations of sidelink zones; and
determine whether to transmit the sidelink timing synchronization signal to the second UE based at least in part on whether transmission of the sidelink timing synchronization signal is configured for the combination.

14. The first UE of claim 10, wherein the one or more processors, to cause the UE to determine whether to transmit the sidelink timing synchronization signal to the second UE, are configured to cause the UE to:
determine to transmit the sidelink timing synchronization signal to the second UE; and
wherein the one or more processors, to selectively transmit the sidelink timing synchronization signal to the second UE, are configured to:
transmit the sidelink timing synchronization signal to the second UE based at least in part on determining to transmit the sidelink timing synchronization signal to the second UE.

15. The first UE of claim 10, wherein the one or more processors, to cause the UE to determine whether to transmit the sidelink timing synchronization signal to the second UE, are configured to cause the UE to:
determine to refrain from transmitting the sidelink timing synchronization signal to the second UE; and
wherein the one or more processors, to selectively transmit the sidelink timing synchronization signal to the second UE, are configured to:
refrain from transmitting the sidelink timing synchronization signal to the second UE based at least in part on determining to refrain from transmitting the sidelink timing synchronization signal to the second UE.

16. A non-transitory computer-readable medium storing one or more instructions for wireless communication, the one or more instructions comprising:
one or more instructions that, when executed by one or more processors of a first user equipment (UE), cause the one or more processors to:
determine a sidelink zone in which the first UE is located and a sidelink zone in which a second UE is located;
determine whether to transmit a sidelink timing synchronization signal to the second UE based at least in part on the sidelink zone in which the first UE is located and the sidelink zone in which the second UE is located; and
selectively transmit the sidelink timing synchronization signal to the second UE based at least in part on determining whether to transmit the sidelink timing synchronization signal to the second UE.

17. The non-transitory computer-readable medium of claim 16, wherein the one or more instructions, when executed by the one or more processors, further cause the one or more processors to:
determine one or more parameters for the sidelink timing synchronization signal based at least in part on the sidelink zone in which the first UE is located and the sidelink zone in which the second UE is located.

18. The non-transitory computer-readable medium of claim 17, wherein the one or more parameters for the sidelink timing synchronization signal comprise at least one of:
a bandwidth of the sidelink timing synchronization signal,
a quantity of repetitions of the sidelink timing synchronization signal,
a waveform type of the sidelink timing synchronization signal,
a time domain pattern of the sidelink timing synchronization signal,
a frequency domain pattern of the sidelink timing synchronization signal,
a sequence length of the sidelink timing synchronization signal, a root sequence of the sidelink timing synchronization signal, or a cyclic shift of the sidelink timing synchronization signal.

19. The non-transitory computer-readable medium of claim 17, wherein the one or more instructions that cause the one or more processors to determine the one or more parameters for the sidelink timing synchronization signal further cause the one or more processors to:
   identify a combination of the sidelink zone in which the first UE is located and the sidelink zone in which the second UE is located from a plurality of configured combinations of sidelink zones; and
   identify a particular combination of the one or more parameters for the sidelink timing synchronization signal associated with the combination.

20. The non-transitory computer-readable medium of claim 19, wherein the one or more instructions that cause the one or more processors to identify the particular combination of the one or more parameters for the sidelink timing synchronization signal associated with the combination further cause the one or more processors to:
   identify the particular combination of the one or more parameters for the sidelink timing synchronization signal based at least in part on at least one of:
   a table,
   a standard,
   a specification, or
   a configuration stored by the first UE.

21. The non-transitory computer-readable medium of claim 16, wherein the one or more instructions that cause the one or more processors to determine whether to transmit the sidelink timing synchronization signal to the second UE further cause the one or more processors to:
   identify a combination of the sidelink zone in which the first UE is located and the sidelink zone in which the second UE is located from a plurality of configured combinations of sidelink zones; and
   determine whether to transmit the sidelink timing synchronization signal to the second UE based at least in part on whether transmission of the sidelink timing synchronization signal is configured for the combination.

22. The non-transitory computer-readable medium of claim 21, wherein the one or more instructions, when executed by the one or more processors, further cause the one or more processors to:
   determine whether transmission of the sidelink timing synchronization signal is configured for the combination based at least in part on at least one of:
   a table,
   a standard,
   a specification, or
   a configuration stored by the first UE.

23. The non-transitory computer-readable medium of claim 16, wherein the one or more instructions that cause the one or more processors to determine whether to transmit the sidelink timing synchronization signal to the second UE further cause the one or more processors to:
   determine to transmit the sidelink timing synchronization signal to the second UE; and
   wherein the one or more instructions that cause the one or more processors to selectively transmit the sidelink timing synchronization signal to the second UE further cause the one or more processors to:
   transmit the sidelink timing synchronization signal to the second UE based at least in part on determining to transmit the sidelink timing synchronization signal to the second UE.

24. The non-transitory computer-readable medium of claim 16, wherein the one or more instructions that cause the one or more processors to determine whether to transmit the sidelink timing synchronization signal to the second UE further cause the one or more processors to:
   determine to refrain from transmitting the sidelink timing synchronization signal to the second UE; and
   wherein the one or more instructions that cause the one or more processors to selectively transmit the sidelink timing synchronization signal to the second UE further cause the one or more processors to:
   refrain from transmitting the sidelink timing synchronization signal to the second UE based at least in part on determining to refrain from transmitting the sidelink timing synchronization signal to the second UE.

25. An apparatus of a first user equipment (UE) for wireless communication, comprising:
   means for determining a sidelink zone in which the first UE is located and a sidelink zone in which a second UE is located;
   means for determining whether to transmit a sidelink timing synchronization signal to the second UE based at least in part on the first UE determining the sidelink zone in which the first UE is located and the sidelink zone in which the second UE is located; and
   selectively transmitting the sidelink timing synchronization signal to the second UE based at least in part on determining whether to transmit the sidelink timing synchronization signal to the second UE.

26. The apparatus of claim 25, further comprising:
   means for determining one or more parameters for the sidelink timing synchronization signal based at least in part on the sidelink zone in which the first UE is located and the sidelink zone in which the second UE is located.

27. The apparatus of claim 26, wherein the one or more parameters for the sidelink timing synchronization signal comprise at least one of:
   a bandwidth of the sidelink timing synchronization signal,
   a quantity of repetitions of the sidelink timing synchronization signal,
   a waveform type of the sidelink timing synchronization signal,
   a time domain pattern of the sidelink timing synchronization signal,
   a frequency domain pattern of the sidelink timing synchronization signal,
   a sequence length of the sidelink timing synchronization signal,
   a root sequence of the sidelink timing synchronization signal, or
   a cyclic shift of the sidelink timing synchronization signal.

28. The apparatus of claim 26, wherein the means for determining the one or more parameters for the sidelink timing synchronization signal includes:
   means for identifying a combination of the sidelink zone in which the first UE is located and the sidelink zone in which the second UE is located from a plurality of configured combinations of sidelink zones; and
   means for identifying a particular combination of the one or more parameters for the sidelink timing synchronization signal associated with the combination.

29. The apparatus of claim 28, wherein the means for identifying the particular combination of the one or more parameters for the sidelink timing synchronization signal associated with the combination includes:
  means for identifying the particular combination of the one or more parameters for the sidelink timing synchronization signal based at least in part on at least one of:
  a table,
  a standard,
  a specification, or
  a configuration stored by the first UE.

30. The apparatus of claim 26, wherein the means for determining whether to transmit the sidelink timing synchronization signal to the second UE includes:
  means for identifying a combination of the sidelink zone in which the first UE is located and the sidelink zone in which the second UE is located from a plurality of configured combinations of sidelink zones; and
  means for determining whether to transmit the sidelink timing synchronization signal to the second UE based at least in part on whether transmission of the sidelink timing synchronization signal is configured for the combination.

* * * * *